April 17, 1934.  M. T. LOTHROP ET AL  1,955,195
METHOD OF MAKING BEARING RACEWAYS
Filed Feb. 15, 1932

INVENTOR:
Marcus T. Lothrop and
Albert L. Bergstrom
by Barnett, Barnett & Crumley
THEIR ATTORNEYS Patented Apr. 17, 1934

1,955,195

UNITED STATES PATENT OFFICE 1,955,195

METHOD OF MAKING BEARING RACEWAYS

Marcus T. Lothrop and Albert L. Bergstrom, Canton, Ohio, assignors to The Timken Roller Bearing Company, Canton, Ohio, a corporation of Ohio Application February 15, 1932, Serial No. 592,919

5 Claims. (Cl. 29—148.4)

Our invention relates to the manufacture of raceway members for roller bearings. Its principal objects are to minimize waste of expensive material, minimize cutting operations, reduce labor, reduce cost of maintenance of tools and machinery, increase the speed of production, and produce raceway members with true and sound raceway surfaces. The invention consists principally in coining semi-hot cylindrical slugs into partially completed green raceway members which may be readily completed as green raceway members ready for such later operations as chamfering, case hardening, heat treatment and grinding, if desired.

In the accompanying drawing, wherein like numerals refer to like parts wherever they occur, Fig. 1 is an end view of a cylindrical tube constituting the stock from which the raceway members are formed;

We use a hollow or tubular cylindrical slug 1 whose inner and outer surfaces are smooth and sound and concentric. Such a slug 1 may be produced in any suitable way; but we prefer to make it by cutting or shearing a short section or ring off of the end of a seamless tube 2 whose outer surface has been carefully turned to a true sound cylindrical surface. The inner surface of the slug 1 may be accurately finished concentric with the outer surface by a boring operation; but we prefer to use a planing or broaching operation. For this purpose, the slug 1 is seated in a suitable holder 3 concentric with the axis of a reciprocatable punch 4 whose front edge, which acts as a broach or plane cutter, is of truly circular form and of a diameter required for the bore of said slug. The ends of the slug are substantially perpendicular to the axis thereof; and the volume of the metal in the slug is substantially equal to the amount of metal in the finished raceway member plus a small allowance for loss in operations hereinafter mentioned.

Figure 6:
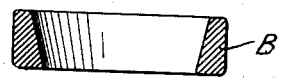
Fig. 6 is an axial section through a finished cup or outer raceway member.
Figure 7:
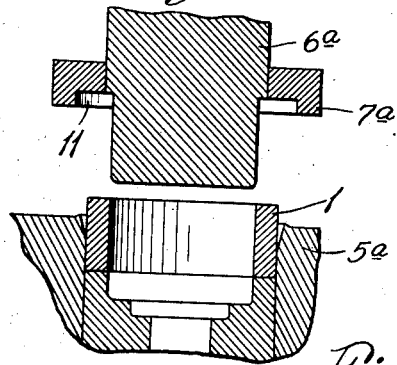
Figs. 7 and 8 are views, similar to Figs. 4 and 5, respectively, through a coining die used for forming the cone or inner raceway member.
Figure 8:
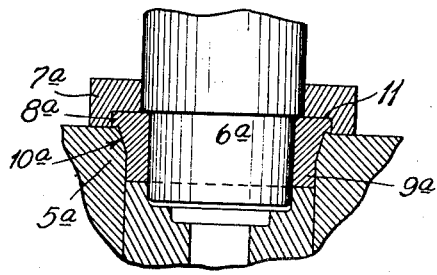
Figure 9:
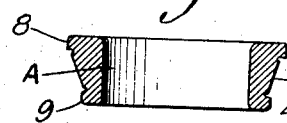
Fig. 9 is an axial section through the finished cone or inner raceway member.

The thickness of the wall of the finished slug is substantially equal to the thickness of the wall of the product at an intermediate point between the ends of such product. In making a cone or inner raceway member A, as shown in Fig. 9, the inside diameter of the slug is substantially equal to the inside diameter of the product; and in making a cup or outer raceway member B, as shown in Fig. 6, the outside diameter of the slug is substantially equal to the outside diameter of the finished cup.

The cylindrical slug 1 above described is heated to a temperature below the temperature at which scale is formed in appreciable quantity on the surface of the work. In the manufacture of raceway members for roller bearings, nickel molybdenum alloy steel is commonly used; and such steel can be worked advantageously in our process at a temperature as high as 1000 to 1400 degrees Fahrenheit without appreciable scaling. The purpose of the heating is to soften the metal and make it easier to coin and cut; but it is important to prevent the formation of scale for several reasons, particularly because scales affect the soundness of the surface and because they are harder than the body of the metal and act abrasively on the tools and dies. As the temperature of the heated slug is high in comparison with ordinary cold forging and low in comparison with what is ordinarily called hot forging, the term "semi-hot" is used herein to indicate a temperature high enough to soften the metal and still not high enough to produce appreciable scaling of the metal.

Figure 1:
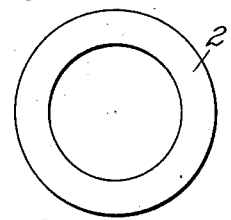
Figure 2:
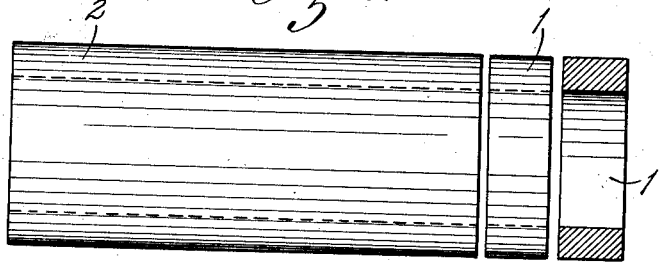
Fig. 2 is a side elevation of said tube, with sections cut therefrom to form cylindrical slugs.
Figure 3:
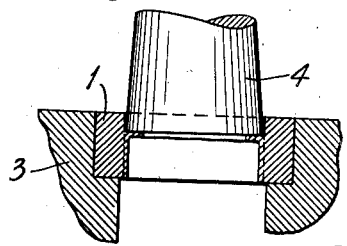
Fig. 3 is a vertical sectional view, showing the operation of finishing the inner surface of the slug concentric with the outer surface thereof.
Figure 4:
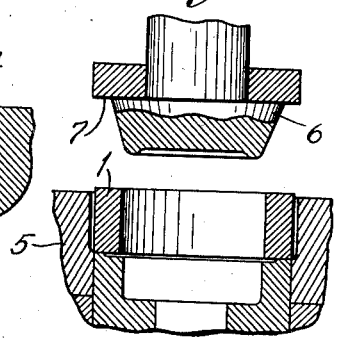
Fig. 4 is a vertical sectional view through a coining die, with the slug shown seated in the die member.
Figure 5:
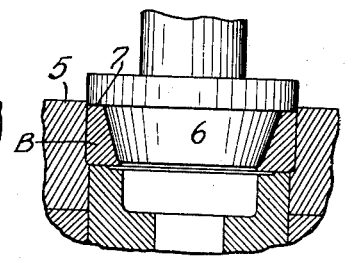
Fig. 5 is a view similar to Fig. 4, showing the shape of the slug after the forward movement of the punch member of the coining die.

The semi-hot slug 1 is placed in a coining die which is indicated more or less diagrammatically in Figs. 4 and 5 and which will be more fully described in application for patent therefor to be filed by us. Said die comprises two main members, the die 5 proper, which is stationary and the reciprocatable plunger 6 concentric therewith and movable into said die.

The inner face of the die member 5 is of the form and dimensions required for the outer surface of the raceway member to be formed therein; and the outer surface of the punch 6 is of substantially the form and dimensions required for the inner surface of the raceway member to be formed thereby. The slug is centered in the die 5 and then the punch 6 moves forward. The initial movement of the punch brings its forward end inside of the bore of the slug 1 without moving the slug; but the later movement of the punch causes the shoulder 7 thereon to bear against the end of the slug (which projects beyond the die) and forces the slug forwardly until said shoulder drives the slug home and said shoulder is substantially in contact with the end of the die. The result of this operation is to upset the cylindrical slug throughout the greater portion of its length, causing the slug to shorten in length and at the same time fill the space between the punch 6 and the die 5 by spreading the metal laterally against their surfaces.

After the slugs are hot formed into cups or cones they are allowed to cool. The cutting operations required to give the work its final form, such as radiusing and chamfering, are then performed in a lathe or other suitable machine while the parts are still cold.

The cone or inner raceway member A of a conical roller bearing usually has circumferential ribs 8 and 9 at its respective ends with a conical raceway surface 10 between them. In the manufacture of such cones by the present process provision is made for the formation of the rib 8 at the large end of the cone by making an annular recess 11 in the inner corner of the shoulder piece 7a of the punch 6a, such recess being of greater diameter than the diameter of the edge of the die 5a. Provision is also made for the formation of the rib 9 at the smaller end of the finished cone A by making the inner end of the wall of the die 5a of cylindrical form and of a diameter equal to or very slightly greater than the diameter of said rib of said finished cone; and in consequence of these provisions, upsetting of the cylindrical slug produces a circumferential rib 8a at the large end of the work and a relatively long or wide cylindrical portion 9a at the other end, with a conical surface 10a between said rib and said cylindrical portion, which conical surface is of the taper and dimensions required for the finished raceway 10. The work in this condition is brought to the stage of the green cone by facing and undercutting the inner face of the rib 8 at the large end, and by facing and radiusing the other face of the rib 9 at the small end; and by widening the conical surface 10a to the full width of the raceway 10 required, and by cutting a groove in the angle between such widened conical surface and the inner face of the rib 9 at the small end of the cone. These cutting operations are simple and capable of being performed on an ordinary lathe after the work has cooled.

The green raceway members are then case hardened, as by carburizing, and then heat treated conformably to common or other suitable practice. Such raceway members are then ready for grinding, if such grinding is required.

The principal advantages of the foregoing process are that it saves up to 50 to 60 percentum of the metal in comparison with the usual practice of making such articles, and the material is an expensive alloy steel. In the next place, the new coining process produces a sounder surface in the finished product than is easily obtainable with the usual processes that involve cutting of the material. Again, the operation of coining not only gives a sound and true surface of accurate dimensions but is very much more rapid than the usual practice; and by operating on the work at a semi-hot temperature, the operation may be performed by a relatively small and rapid coining press and without producing any scale on the work. Another important advantage arising from the semi-hot working of the metal is that the life of the dies is greatly prolonged and the cost of maintenance thereof greatly reduced. Along with the foregoing advantages and economies are considerable saving of labor, saving in factory space for each individual coining press together with increased output of each individual coining press, and other advantages of like character.

What we claim is:

1. In a process of making conical raceway members for roller bearings die forging a cylindrical ring of nickel molybdenum alloy steel at a temperature of approximately 1200° F. to 1400° F. into a ring which has one portion of its surface in the form of a cone of substantially the taper and diameter required for the raceway surface of such member and with the portions next to said cone adapted for conversion into annular ribs by removal of surplus metal.

2. The process of making conical raceway members which consists in forming a cylindrical annular slug of molybdenum alloy steel, making the inner and outer surfaces thereof true and concentric by broaching the same longitudinally, and die forging such slug at a temperature of from 1000 to 1400 degrees Fahrenheit into a ring which has one portion of its surface in the form of a cone of substantially the taper and diameter required for the raceway surface of such member.

3. The process of making raceway members for roller bearings which consists in forming a cylindrical annular slug with concentric inner and outer surfaces and having a volume of metal slightly in excess of the volume of metal in the finished article, die forging such annular slug into a ring which has the middle portion of its surface in the form of a cone of substantially the taper and diameter required for the raceway surface of such member merging into a substantially cylindrical portion at its smaller end and then extending said cone by removal of metal at the angle between said cone and said cylindrical portion.

4. In a process of making cones for roller bearings, die forging a semi-hot ring, with a cylindrical outer surface of approximately the same diameter as that of the rib at the small end of the cone, into a ring whose outer surface has a cylindrical portion of approximately said diameter at one end, and a circumferential rib at the other end of said ring of approximately the diameter of the rib at the large end of the cone, the intermediate portion being of substantially the size and taper required for the raceway of the product.

5. The process of making cones for roller bearings which comprises die forging a semi-hot ring, whose diameter and wall thickness are approximately the same as those of the small rib of the cone with a cylindrical outer surface into a ring whose outer surface has a cylindrical end portion of said diameter and wall thickness, an intermediate conical portion of substantially the size and taper required for the raceway of the product and a circumferential rib at the large end of said ring of approximately the diameter desired for the rib at the large end of the cone, and then removing the surface part of the inner end of the cylindrical portion to produce a conical surface flush with said intermediate portion but leaving a circumferential rib at the end thereof.

MARCUS T. LOTHROP.
ALBERT L. BERGSTROM.